(12) United States Patent
Chen et al.

(10) Patent No.: US 10,803,861 B2
(45) Date of Patent: Oct. 13, 2020

(54) METHOD AND APPARATUS FOR IDENTIFYING INFORMATION

(71) Applicant: Baidu Online Network Technology (Beijing) Co., Ltd., Beijing (CN)

(72) Inventors: Xiaojian Chen, Beijing (CN); Lifeng Zhao, Beijing (CN); Jun Li, Beijing (CN); Yushu Cao, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 22 days.

(21) Appl. No.: 15/857,008

(22) Filed: Dec. 28, 2017

(65) Prior Publication Data

US 2019/0147860 A1    May 16, 2019

(30) Foreign Application Priority Data

Nov. 15, 2017   (CN) .......................... 2017 1 1128321

(51) Int. Cl.
| | |
|---|---|
| *G10L 15/22* | (2006.01) |
| *G10L 15/30* | (2013.01) |
| *G10L 15/08* | (2006.01) |
| *G10L 25/51* | (2013.01) |

(52) U.S. Cl.
CPC .............. *G10L 15/22* (2013.01); *G10L 15/08* (2013.01); *G10L 15/30* (2013.01); *G10L 25/51* (2013.01); *G10L 2015/088* (2013.01)

(58) Field of Classification Search
CPC ......... G10L 15/22; G10L 15/08; G10L 15/30; G10L 25/51; G10L 2015/088; G10L 2105/088
See application file for complete search history.

(56) References Cited

U.S. PATENT DOCUMENTS

| | | | |
|---|---|---|---|
| 9,589,560 B1* | 3/2017 | Vitaladevuni | ........... G10L 15/01 |
| 9,697,828 B1* | 7/2017 | Prasad | ................... G10L 15/18 |
| 10,069,976 B1* | 9/2018 | Gunther | ............. H04M 3/5237 |
| 2004/0010409 A1 | 1/2004 | Ushida et al. | |
| 2014/0163978 A1 | 6/2014 | Basye et al. | |
| 2016/0125883 A1 | 5/2016 | Koya | |

(Continued)

FOREIGN PATENT DOCUMENTS

| | | |
|---|---|---|
| CN | 103700368 A | 4/2014 |
| CN | 104219388 A | 12/2014 |

(Continued)

*Primary Examiner* — Michelle M Koeth
(74) *Attorney, Agent, or Firm* — Seed IP Law Group LLP

(57) ABSTRACT

Embodiments of the present disclosure disclose a method and apparatus for identifying information. One embodiment of the method includes: collecting to-be-processed audio in real-time; performing voice recognition on the to-be-processed audio; performing data-processing on the to-be-processed audio, when the audio is recognized as a wake-up word, the wake-up word is used for instructing performing data-processing on the to-be-processed audio. The embodiment can identify keywords from the to-be-processed audio obtained in real-time and then perform data-processing on the to-be-processed audio, which improves completeness in obtaining the to-be-processed audio and accuracy in performing data-processing on the to-be-processed audio.

6 Claims, 5 Drawing Sheets

(56) References Cited

U.S. PATENT DOCUMENTS

| | | | | |
|---|---|---|---|---|
| 2017/0125036 A1* | 5/2017 | Wang | .................. | G10L 17/22 |
| 2018/0108351 A1* | 4/2018 | Beckhardt | ............... | G10L 15/32 |
| 2019/0035398 A1* | 1/2019 | Choi | .................. | G10L 15/30 |
| 2019/0066680 A1* | 2/2019 | Woo | .................. | G10L 15/08 |

FOREIGN PATENT DOCUMENTS

| | | |
|---|---|---|
| CN | 106448663 A | 2/2017 |
| CN | 106653013 A | 5/2017 |

* cited by examiner

METHOD AND APPARATUS FOR IDENTIFYING INFORMATION

CROSS-REFERENCE TO RELATED APPLICATION

This application claims the priority of Chinese Patent Application No. 201711128321.X, entitled "Method and Apparatus for Identifying Information," filed on Nov. 15, 2017, the content of which is incorporated herein by reference in its entirety.

TECHNICAL FIELD

Embodiments of the present disclosure relate to the technical field of data processing, in particular to the technical field of voice recognition, and more specifically to a method and apparatus for identifying information.

BACKGROUND

With the development of artificial intelligence and the continuous improvement of voice recognition technology, data processing by means of voices has become more and more intelligent. One can, through voices, complete the data processing that has to be done manually in the past, which provides an additional way for obtaining information, and improves efficiency in obtaining information. For example, when using a terminal device supporting voice recognition, the user may wake up the terminal device by using wake-up words first; after the terminal device is awakened, the user is informed of the terminal device being in an awakened state by means of voices or texts, and is prompted to input voice information. Afterwards, the user sends the voice information to the terminal device, and the terminal device starts to collect the voice information input by the user and processes the voice information to obtain the corresponding result information, and finally, the result information is fed back to the user.

SUMMARY

The purpose of the embodiments of the present disclosure lies in proposing a method and apparatus for identifying information, to solve the technical problems mentioned in the background.

According to a first aspect, an embodiment of the present disclosure provides a method for identifying information, including: collecting to-be-processed audio in real-time; performing voice recognition on the to-be-processed audio; performing data-processing on the to-be-processed audio, when the audio is recognized as a wake-up word, the wake-up word is used for instructing performing data-processing on the to-be-processed audio.

In some embodiments, the performing audio recognition on the to-be-processed audio includes: performing audio recognition on the to-be-processed audio through a preset wake-up word audio.

In some embodiments, the method further includes the determining the recognition accuracy of the wake-up word audio, and the determining the recognition accuracy of the wake-up word audio includes: performing audio analysis on the detected wake-up word audio to obtain to-be-identified audio information; comparing the to-be-identified audio information with the audio information of the preset wake-up word audio to obtain the accuracy of the to-be-identified audio; and when the accuracy is greater than a set value, the wake-up word audio is determined to be accurate, otherwise, the wake-up word audio is determined to be inaccurate.

In some embodiments, the performing data processing on the to-be-processed audio includes: performing data processing on the to-be-processed audio when the wake-up word audio is accurate, and obtaining response information corresponding to to-be-processed audio.

In some embodiments, the performing data processing on the to-be-processed audio includes: sending to-be-processed audio to a server when the wake-up word audio is inaccurate; and identifying, by the server, the wake-up word audio; and receiving the identification information corresponding to the to-be-processed audio sent from the server; and when the identification information indicates that the to-be-processed audio contains a wake-up word, performing data processing on the to-be-processed audio.

According to a second aspect, an embodiment of the present disclosure provides an apparatus for identifying information, where the apparatus includes: an audio collecting unit for collecting to-be-processed audio in real-time; a voice recognizing unit for performing voice recognition on the to-be-processed audio; an data processing unit for performing data-processing on the to-be-processed audio, when the audio is recognized as a wake-up word, the wake-up word is used for instructing performing data-processing on the to-be-processed audio.

In some embodiments, the voice recognizing unit includes: performing audio recognition on the to-be-processed audio by using a preset wake-up word audio.

In some embodiments, the apparatus further comprises an accuracy determining unit for determining recognition accuracy for wake-up word audio, and the accuracy determining unit comprises: a to-be-identified audio information obtaining sub-unit for performing an audio analysis on detected wake-up word audio to obtain information of to-be-identified audio; an accuracy determining sub-unit for comparing the information of the to-be-identified audio with the information of the audio of the preset wake-up word, so as to obtain the accuracy of the to-be-identified audio, wherein when the accuracy is greater than a preset value, the wake-up word audio is determined to be accurate, and otherwise, the wake-up word audio is determined to be inaccurate.

In some embodiments, the data-processing unit comprises: performing data-processing on the to-be-processed audio when the wake-up word audio is accurate, so as to obtain response information corresponding to the to-be-processed audio.

In some embodiments, the data-processing unit comprises: an information sending sub-unit for sending the to-be-processed audio to a server when the wake-up word audio is inaccurate, the server is configured to identify the wake-up word audio; an identification information receiving sub-unit for receiving identification information corresponding to the to-be-processed audio sent by the server; and a data processing subunit for performing data-processing on the to-be-processed audio when the identification information indicates that the to-be-processed audio contains wake-up word.

According to a third aspect, an embodiment of the present disclosure provides a server, comprising one or more processors; a memory for storing one or more programs, the one or more processors execute the method for identifying information according to the first aspect when the one or more programs are executed by the one or more processors.

According to a fourth aspect, an embodiment of the present disclosure provides a computer readable memory medium, on which computer programs are stored, characterized in that the method for identifying information according to the first aspect is realized when the programs are executed by a processor.

The method and apparatus for identifying information provided by the embodiments of the present disclosure collect to-be-processed audio in real-time and perform data processing on the to-be-processed audio when the keyword audio corresponding to the keyword is recognized from the to-be-processed audio. The ability of directly performing data-processing on to-be-processed audio after recognizing the key word from the to-be-processed audio obtained in real-time, improves the completeness of obtaining the to-be-processed audio and the accuracy of performing data-processing on the to-be-processed audio.

BRIEF DESCRIPTION OF THE DRAWINGS

Other features, objects, and advantages of the present disclosure will become more apparent by reading detailed description of non-limiting embodiments, with reference to the following drawings, in which.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
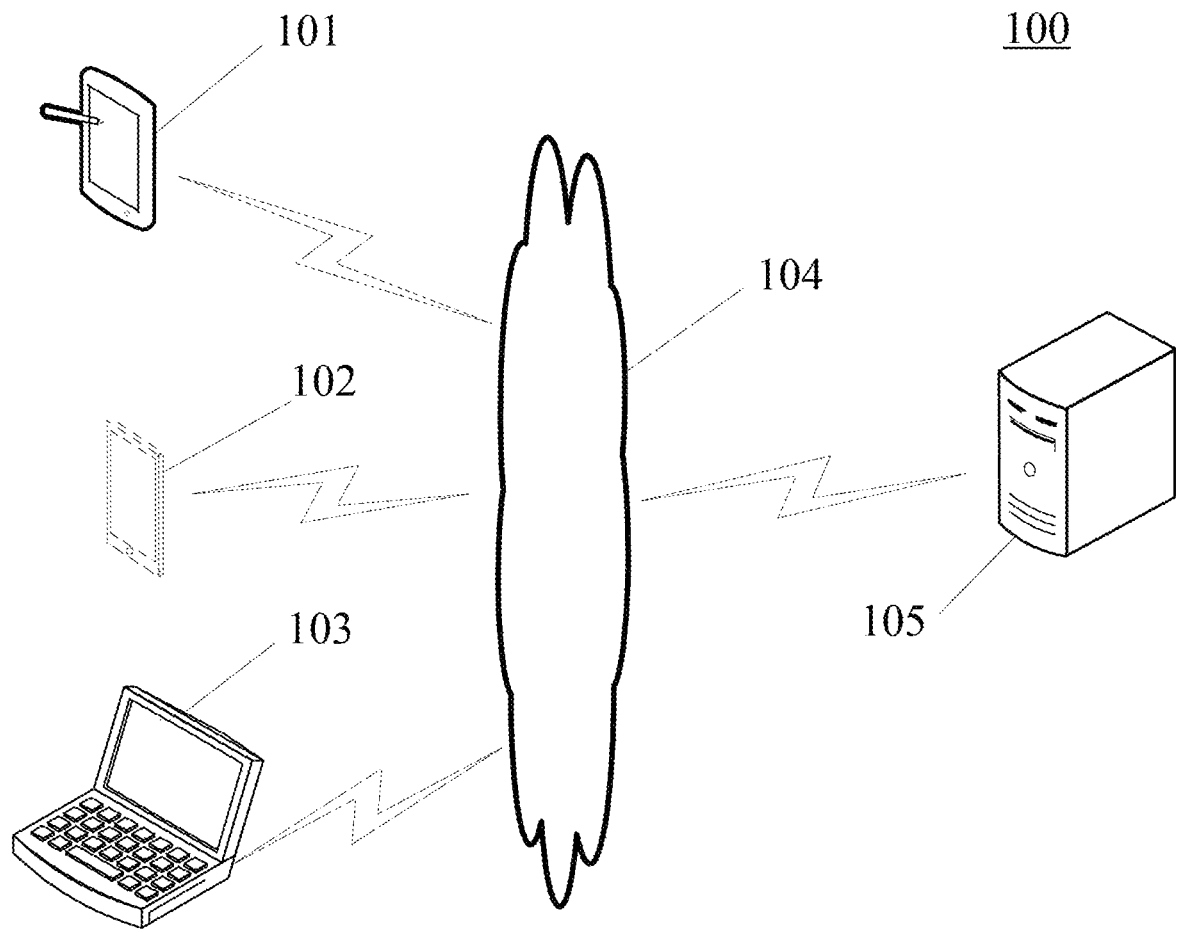
FIG. 1 is an architectural diagram of an exemplary system to which the present disclosure may be implemented.

FIG. 1 shows an exemplary architecture of a system 100 which may be used by a method for identifying information or an apparatus for identifying information according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as audio processing applications, web browsing applications, shopping applications, search applications, instant messaging tools, mailbox clients, and social platform software maybe installed on the terminal devices 101, 102 and 103.

Terminal devices 101, 102, and 103 may be various electronic devices having a display screen and supporting web browsing, including but not limited to smart phones, tablets, laptop portable computers, desktop computers, and the like.

A server 105 may be a server that provides various services, for example, a server that recognizes the wake-up word audio sent from the terminal devices 101, 102, and 103. The server can recognize the wake-up word audio to judge the accuracy of the wake-up word audio and return the accuracy result to the terminal devices 101, 102, and 103. The terminal devices 101, 102, and 103 accordingly process the to-be-processed audio according to the received accuracy result.

It should be noted that, the method for identifying information provided in the embodiment of the present disclosure is generally performed by the terminal devices 101, 102 and 103. Correspondingly, the apparatus for identifying information is generally disposed in the terminal devices 101, 102 and 103.

It should be understood that the numbers of terminal devices, networks, and servers in FIG. 1 are merely illustrative. Depending on implementation needs, there may be any number of terminal devices, networks and servers.

Figure 2:
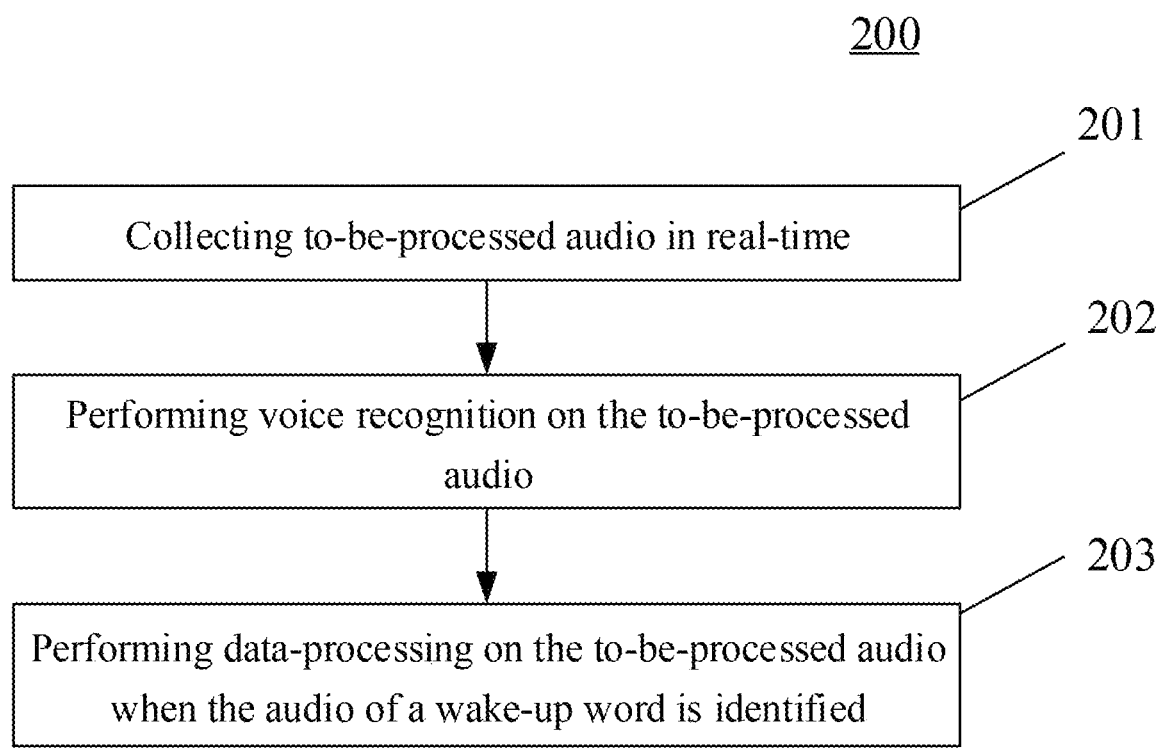
FIG. 2 is a flow chart of one embodiment of a method for identifying information according to the present disclosure.

With continued reference to FIG. 2, a flow 200 of one embodiment of the method for identifying information according to the present disclosure is shown. The method for identifying information comprises the following steps:

Step 201: collecting to-be-processed audio in real-time.

In this embodiment, the electronic device (for example, the terminal devices 101, 102, and 103 shown in FIG. 1) on which the method for identifying information is executed can receive the to-be-processed audio of the user.

When the user needs to query data or invoke other programs through the terminal devices 101, 102, and 103, it is usually necessary to send to-be-processed audio to the terminal devices 101, 102, and 103. It can be known from the above description that the existing method requires the user to wake up the terminal devices 101, 102, and 103 first, and after the terminal devices 101, 102, and 103 are woken up, the user is prompted to continue to input the audio. It can be seen that, in the existing method, the terminal devices 101, 102, and 103 have to be woken up first in the process that the terminal devices 101, 102 and 103 are being woken up, and the user inputs the audio that requires data processing when the terminal devices 101, 102, and 103 are in the working state. That is, there is an interruption process (a process in which the terminal devices 101, 102, and 103 are woken up) when the user inputs audio to the terminal devices 101, 102, and 103, which leads to poor user experience In the process that the terminal devices 101, 102 and 103 are being woken up, due to time delay, part of the audio of the terminal device 101, 102 and 103 may be missed, as a result, subsequent data processing on the audio is inaccurate or incorrect.

For this reason, the terminal devices 101, 102, and 103 of the present disclosure can collect the to-be-processed audio input by the user in real-time, that is, the to-be-processed audio collected by the terminal devices 101, 102 and 103 is the complete audio input by the user and the collected to-be-processed audio does not have the above interruption process. It should be noted that during the process of subsequent recognizing of to-be-processed audio and performing data processing on the to-be-processed audio, the terminal devices 101, 102, and 103 are always in the process of collecting the to-be-processed audio in real-time. That is, the audio information contained in the to-be-processed audio has been increasing throughout the process, which is meant to be the above-mentioned real-time collection.

Step 202: performing audio recognition on the to-be-processed audio.

In practice, the to-be-processed audio collected by the terminal devices 101, 102, and 103 may be audio that needs data processing (for example, the audio input by a user), and may be other audio that does not need data processing (for example, recorded noise or other disturbing signals). Therefore, after the terminal device 101, 102, and 103 collect the to-be-processed audio, it needs to perform audio recognition on the to-be-processed audio to determine whether the to-be-processed audio needs data processing.

In some optional implementations of this embodiment, the performing audio recognition on the to-be-processed audio may include: performing audio recognition on the to-be-processed audio through a preset wake-up word audio.

In order to identify whether the to-be-processed audio needs data-processing, wake-up word audio may be set on the terminal devices 101, 102, and 103 in advance. When voice recognition is performed on the to-be-processed audio and the wake-up word audio is recognized, it is believed that the to-be-processed audio needs data processing by the terminal devices 101, 102, and 103. Otherwise, it is believed that the to-be-processed audio does not require data processing by the terminal devices 101, 102, and 103.

Step 203: when audio of a wake-up word is recognized, performing data processing on the to-be-processed audio.

When the wake-up word audio is identified from the to-be-processed audio, it indicates that the to-be-processed audio is the audio information that needs data processing. Therefore, the terminal devices 101, 102, and 103 can perform data processing on the to-be-processed audio. Since the to-be-processed audio is collected in real-time and contains all the audio information input by the user, the above interruption process in the prior art is avoided and the integrity of the to-be-processed audio is guaranteed (in existing technology, data processing is usually performed on the audio after the wake-up word rather than on all collected audio), avoiding missing information when data processing is performed on the to-be-processed audio, therefore, a complete data processing is performed to the to-be-processed audio so as to improve the accuracy of performing data processing on the to-be-processed audio. The wake-up word is used to instruct performing data processing on the to-be-processed audio. The wake-up word may be set on the terminal device 101, 102 and 103 or may be customized by the user, depending on actual needs.

In some optional implementations of the present embodiment, the above method further includes a step of determining the recognition accuracy of the wake-up word audio, and the step of determining the recognition accuracy of the wake-up word audio may include:

A first step, performing audio analysis on the detected wake-up words results in audio information to be recognized.

The to-be-processed audio input by the user to the terminal devices 101, 102, and 103 may include audio of non-wake-up words that are similar to the wake-up words. Therefore, it is necessary to perform further audio analysis on the detected audio of the wake-up word, and to judge the audio of the detected wake-up word through the audio information to be identified obtained through the audio analysis.

A second step of comparing the audio information to be recognized with the audio information of the preset wake-up word audio to obtain the accuracy of the audio to be recognized; and when the accuracy is greater than the set value, determining that the wake-up word audio is accurate. Otherwise, it is inaccurate to judge the audio of the wake-up word.

After the to be identified audio information is obtained, the to be identified audio information may be compared with the audio information of the preset wake-up word audio to obtain the accuracy of the wake-up word audio relative to the preset wake-up word audio. When the accuracy is greater than a certain set value (for example, it may be 80%), it may be considered that the detected wake-up word has the same audio as the preset wake-up word audio; otherwise, the detected audio of the wake- The wake-up word audio is not the same.

In some optional implementations of this embodiment, the performing data processing on the to-be-processed audio may include: performing data processing on the to-be-processed audio to obtain response information corresponding to the to-be-processed audio when the wake-up word audio is accurate.

When the wake-up word audio is accurate, the terminal devices 101, 102, and 103 may perform data processing on the to-be-processed audio and obtain response information corresponding to the to-be-processed audio. In addition, when the to-be-processed audio is used to instruct to open other applications, the terminal devices 101, 102, and 103 can also initialize the corresponding applications.

In some optional implementations of this embodiment, the performing data processing on the to-be-processed audio may include the following steps:

In the first step, transmitting the to-be-identified audio to a server when the audio of the above wake-up word is inaccurate.

Due to the user's accent, environmental interference and other factors, the terminal device 101, 102, and 103 may not accurately recognize the wake-up word from the collected to-be-processed audio. Therefore, when the wake-up word audio is inaccurate, it may not be directly determined that the to-be-processed audio does not need data-processing. At this point, the to-be-processed audio may be sent to the server for audio detection. The audio detection application on the server may recognize the wake-up word more accurately, thereby improving the accuracy of the wake-up word recognition, and the processing efficiency of the to-be-processed audio by the terminal devices 101, 102, and 103. The server is configured to recognize the wake-up word audio.

Generally, the terminal devices 101, 102, and 103 can perform data transmission with the server 105 in a wired or wireless manner. It should be noted that the wireless connection may include, but is not limited to, a 3G/4G connection, a WiFi connection, a Bluetooth connection, a WiMAX connection, a Zigbee connection, an UWB (ultra wideband) connection and other wireless connection methods known at preset or to be developed in the future.

In the second step, receiving the identification information corresponding to the to-be-processed audio sent by the server.

The server may store a program that is used for detecting audio and not suitable to be stored on the terminal devices 101, 102 and 103. This type of audio processing programs usually occupies a large storage space and has a higher requirement on the processor, thus not suitable to be stored on the terminal devices 101, 102, and 103. In addition, inmost cases, the terminal devices 101, 102, and 103 can relatively accurately recognize the to-be-processed audio, and therefore, it is more suitable to store such audio processing programs on the server 105. After the server 105 receives the to-be-processed audio, the server 105 may detect whether the wake-up word audio is included in the to-be-processed audio.

In the third step, performing data-processing on the to-be-processed audio when the identification information indicates that the to-be-processed audio includes a wake-up word.

When the identification information indicates that the to-be-processed audio includes the wake-up word, the terminal devices 101, 102, and 103 may perform corresponding data processing on the to-be-processed audio.

Figure 3:
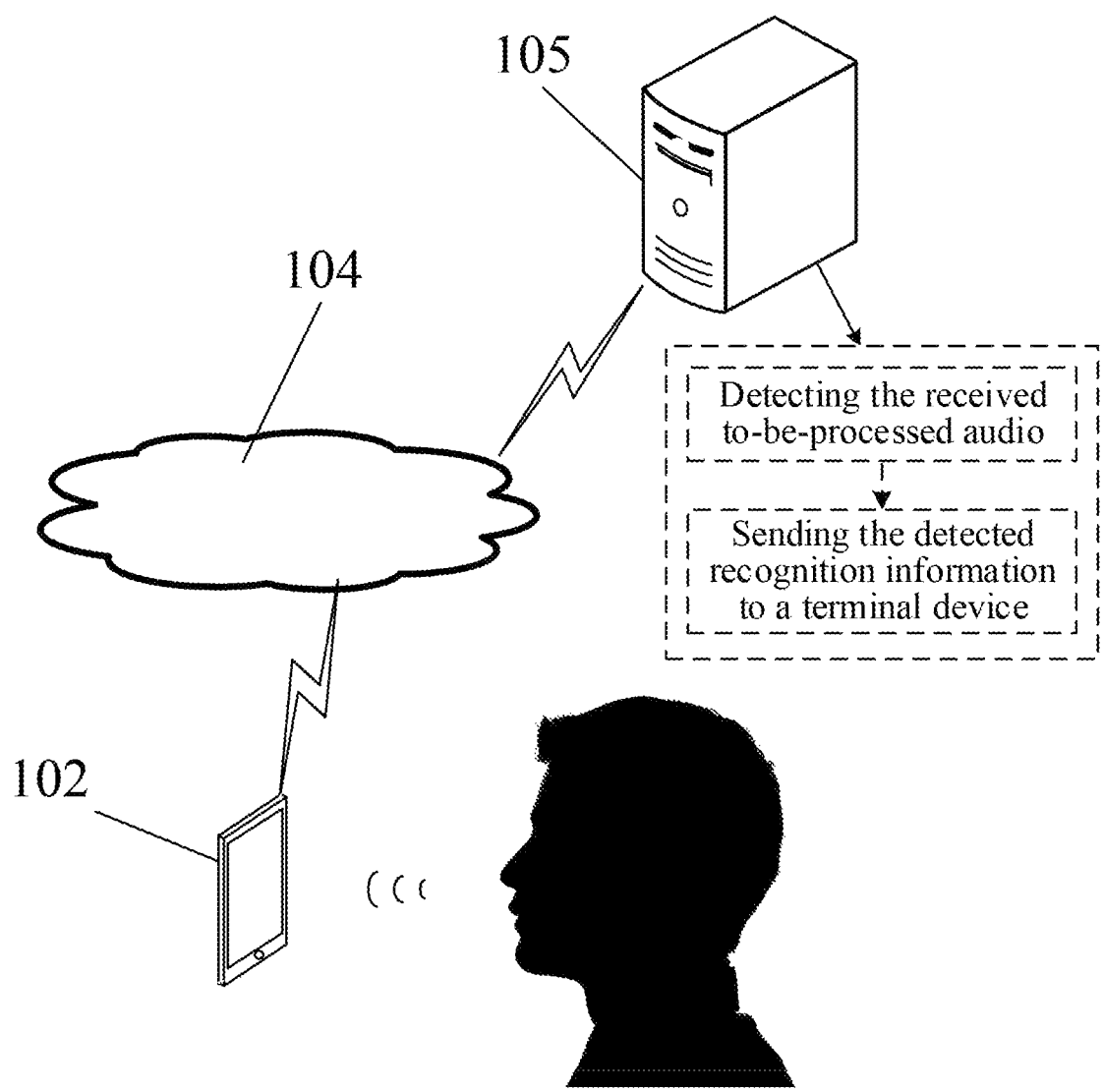
FIG. 3 is a schematic view of an application scenario of a method for identifying information according to the present disclosure.

With continuing reference to FIG. 3, FIG. 3 is a schematic diagram of an application scenario of a method for identifying information according to the present embodiment. In the application scenario of FIG. 3, when the user sends an audio signal to the terminal device 102, the terminal device 102 may collect the corresponding to-be-processed audio in real-time. Afterwards, the terminal device 102 performs audio recognition on the to-be-processed audio. Upon recognizing the wake-up word from the to-be-processed audio, the terminal device 102 may perform data processing on the to-be-processed audio.

The method provided by the above embodiments of the present disclosure collects to-be-processed audio in real-time, and when the keyword audio corresponding to the keyword is identified from the to-be-processed audio, data-processing is performed on the to-be-processed audio. The method can directly perform data-processing on to-be-processed audio after recognizing the keyword from the to-be-processed audio obtained in real-time, thereby improving the completeness of obtaining the to-be-processed audio and the accuracy of performing data-processing on the to-be-processed audio.

Figure 4:
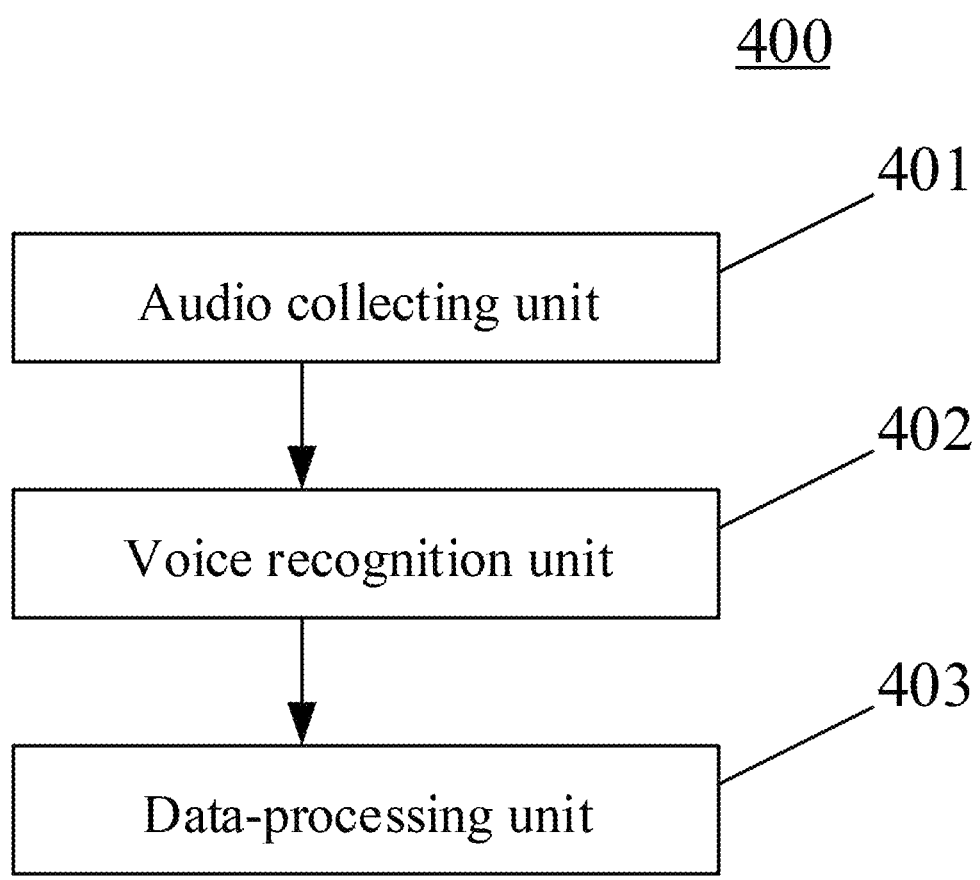
FIG. 4 is a schematic structural diagram of one embodiment of an apparatus for identifying information according to the present disclosure.

With further reference to FIG. 4, as an implementation of the method shown in the above figures, the present disclosure provides an embodiment of an apparatus for identifying information, which corresponds to the method embodiment shown in FIG. 2. The apparatus may be specifically applied to various electronic devices.

As shown in FIG. 4, the apparatus 400 for identifying information in this embodiment may include: an audio collecting unit 401, a voice recognizing unit 402 and a data processing unit 403. The audio collecting unit 401 is configured to collect to-be-processed audio in real-time. The voice recognizing unit 402 is configured to perform audio recognition on to-be-processed audio. The data processing unit 403 is configured to perform data-processing on the to-be-processed audio when the wake-up word audio is identified. The wake-up word is used to instruct performing data processing on the to-be-processed audio.

In some optional implementations of this embodiment, the voice recognizing unit 402 may include: performing audio recognition on to-be-processed audio by using a preset wake-up word audio.

In some optional implementations of this embodiment, the apparatus 400 for identifying information may further include an accuracy determining unit (not shown in the figure), configured to determine the accuracy of audio recognition of the wake-up word. The accuracy determining unit may include: a to-be-identified audio information obtaining subunit (not shown in the figure) and an accuracy determining subunit (not shown in the figure). Wherein the to-be-recognized audio information obtaining subunit is configured to perform audio analysis on the detected wake-up word audio to obtain to-be-identified audio information; and an accuracy determining subunit, configured to compare the to-be-identified audio information with the audio information of the preset wake-up word audio to obtain the accuracy of the to-be-identified audio. When the accuracy is greater than the set value, it is determined that the wake-up word audio is accurate; otherwise, the wake-up word audio is inaccurate.

In some optional implementations of this embodiment, the data processing unit 403 may include: performing data processing on to-be-processed audio when the wake-up word audio is accurate, to obtain response information corresponding to to-be-processed audio.

In some optional implementations of this embodiment, the data processing unit 403 may further include: an information sending subunit (not shown in the figure), an identification information receiving subunit (not shown in the figure), and a data processing subunit (not shown in the figure). The information sending subunit is configured to send the to-be-processed audio to a server if the wake-up word audio is inaccurate, and the server is configured to recognize the wake-up word audio; the identification information receiving subunit is configured to receive the identification information corresponding to the to-be-processed audio sent by the server; and the data processing subunit is configured to perform data-processing on the to-be-processed audio when the identification information indicates that the to-be-processed audio includes a wake-up word.

The present embodiment further provides a server, comprising: one or more processors; a memory for storing one or more programs, when the one or more programs are executed by the one or more processors, the above one or more processors execute the above method for identifying information.

The present embodiment further provides a computer readable storage medium having stored thereon a computer program which implements the above method for identifying information when being executed by a processor.

Figure 5:
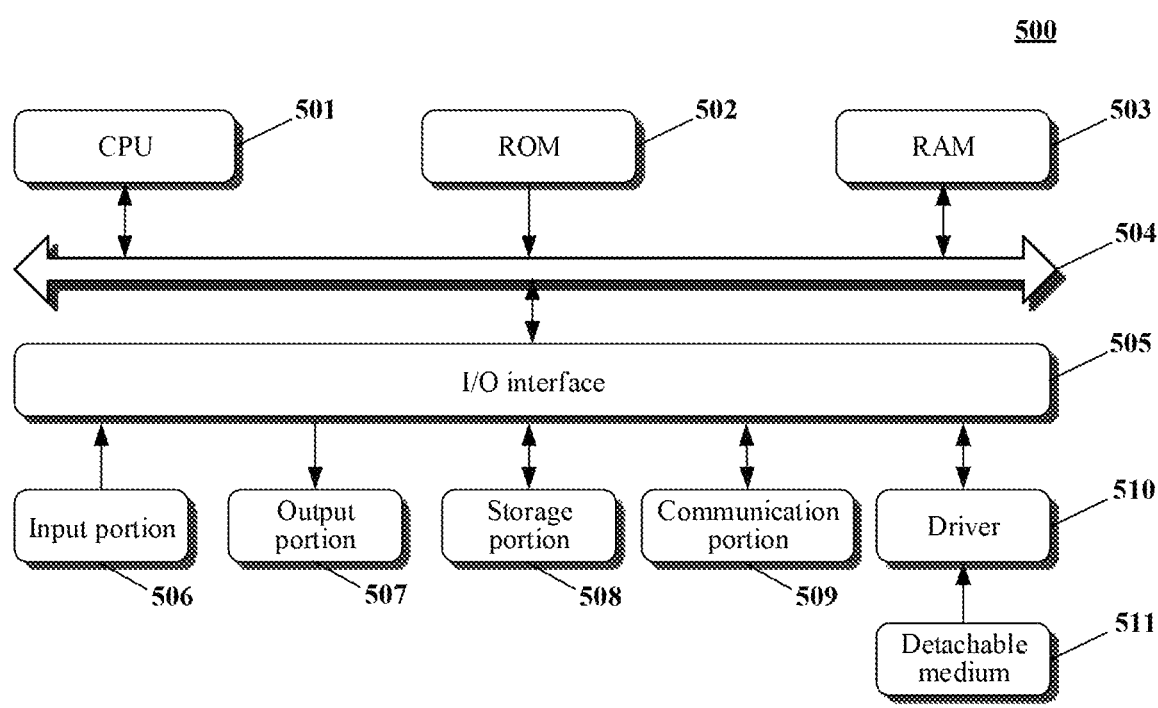
FIG. 5 is a schematic structural diagram of a computer system suitable for implementing the server of the embodiment of the present disclosure.

Referring next to FIG. 5, a schematic structural diagram of a computer system 500 suitable for implementing a server of an embodiment of the present disclosure is shown. The server shown in FIG. 5 is only an example, and should not impose any limitation on the function and the usage scope of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that maybe implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an audio collecting unit, a voice recognizing unit and a data processing unit, where the names of these units or modules do not in some cases constitute a limitation to such units or modules themselves. For example, the data processing unit may also be described as "a unit for performing data-processing on the to-be-processed audio."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: collect to-be-processed audio in real-time; perform voice recognition on the to-be-processed audio; perform data-processing on the to-be-processed audio, when the audio is recognized as a wake-up word, the wake-up word used for instructing performing data-processing on the to-be-processed audio.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for identifying information, the method comprising:
   collecting to-be-processed audio in real-time;
   performing voice recognition on the to-be-processed audio based on preset wake-up word audio;
   determining recognition accuracy for wake-up word audio recognized during the voice recognition, the determining recognition accuracy for the recognized wake-up word audio comprising:
      performing an audio analysis on the recognized wake-up word audio to obtain audio information of the recognized wake-up word audio;
      comparing the audio information of the recognized wake-up word audio with audio information of the preset wake-up word audio, to obtain the accuracy of the recognized wake-up word audio relative to the preset wake-up word audio; and
   determining the recognized wake-up word audio to be accurate in response to determining that the accuracy is greater than a preset value, and determining the recognized wake-up word audio to be inaccurate in response to determining that the accuracy is less than or equal to the preset value; and performing data-processing on the to-be-processed audio, when wake-up word audio is recognized from the to-be-processed audio, the recognized wake-up word being used for instructing the performing data-processing on the to-be-processed audio, comprising:

sending the to-be-processed audio to a server for the server to identify whether the recognized wake-up word audio is contained within the to-be-processed audio, in response to determining that the recognized wake-up word audio is inaccurate;

receiving identification information corresponding to the to-be-processed audio sent by the server; and performing data-processing on the to-be-processed audio when the identification information indicates that the to-be-processed audio contains the recognized wake-up word.

2. The method according to claim 1, wherein the performing data-processing on the to-be-processed audio further comprises:

performing data-processing on the to-be-processed audio when the recognized wake-up word audio is accurate, so as to obtain response information corresponding to the to-be-processed audio.

3. An apparatus for identifying information, the apparatus comprising:

at least one processor; and a memory storing instructions, the instructions when executed by the at least one processor, cause the at least one processor to perform operations, the operations comprising:

collecting to-be-processed audio in real-time;

performing voice recognition on the to-be-processed audio based on preset wake-up word audio;

determining recognition accuracy for wake-up word audio recognized during the voice recognition, the determining recognition accuracy for the recognized wake-up word audio comprising:

performing an audio analysis on the recognized wake-up word audio to obtain audio information of the recognized wake-up word audio;

comparing the audio information of the recognized wake-up word audio with audio information of the preset wake-up word audio, to obtain the accuracy of the recognized wake-up word audio relative to the preset wake-up word audio; and determining the recognized wake-up word audio to be accurate in response to determining that the accuracy is greater than a preset value, and determining the recognized wake-up word audio to be inaccurate in response to determining that the accuracy is less than or equal to the preset value; and performing data-processing on the to-be-processed audio, when wake-up word audio is recognized from the to-be-processed audio, the recognized wake-up word being used for instructing the performing data-processing on the to-be-processed audio, comprising:

sending the to-be-processed audio to a server for the server to identify whether the recognized wake-up word audio is contained within the to-be-processed audio, in response to determining that the recognized wake-up word audio is inaccurate;

receiving identification information corresponding to the to-be-processed audio sent by the server; and performing data-processing on the to-be-processed audio when the identification information indicates that the to-be-processed audio contains the recognized wake-up word.

4. The apparatus according to claim 3, wherein the performing data-processing on the to-be-processed audio further comprises:

performing data-processing on the to-be-processed audio when the recognized wake-up word audio is accurate, so as to obtain response information corresponding to the to-be-processed audio.

5. A terminal device, comprising:

one or more processors;

a memory for storing one or more programs, one or more processors execute the method according to claim 1.

6. A non-transitory computer storage medium storing a computer program, the computer program when executed by one or more processors, causes the one or more processors to perform operations, the operations comprising: collecting to-be-processed audio in real-time;

performing voice recognition on the to-be-processed audio based on preset wake-up word audio;

determining recognition accuracy for wake-up word audio recognized during the voice recognition, the determining recognition accuracy for the recognized wake-up word audio comprising:

performing an audio analysis on the recognized wake-up word audio to obtain audio information of the recognized wake-up word audio;

comparing the audio information of the recognized wake-up word audio with audio information of the preset wake-up word audio, to obtain the accuracy of the recognized wake-up word audio relative to the preset wake-up word audio; and determining the recognized wake-up word audio to be accurate in response to determining that the accuracy is greater than a preset value, and determining the recognized wake-up word audio to be inaccurate in response to determining that the accuracy is less than or equal to the preset value; and performing data-processing on the to-be-processed audio, when wake-up word audio is recognized from the to-be-processed audio, the recognized wake-up word being used for instructing the performing data-processing on the to-be-processed audio, comprising:

sending the to-be-processed audio to a server for the server to identify whether the recognized wake-up word audio is contained within the to-be-processed audio, in response to determining that the recognized wake-up word audio is inaccurate;

receiving identification information corresponding to the to-be-processed audio sent by the server; and performing data-processing on the to-be-processed audio when the identification information indicates that the to-be-processed audio contains the recognized wake-up word.

* * * * *